(12) United States Patent
Sato et al.

(10) Patent No.: US 9,742,987 B2
(45) Date of Patent: Aug. 22, 2017

(54) IMAGE PICKUP DISPLAY APPARATUS, IMAGE PICKUP DISPLAY METHOD, AND RECORDING MEDIUM

(71) Applicant: Olympus Corporation, Shibuya-ku, Tokyo (JP)

(72) Inventors: Akinobu Sato, Hachioji (JP); Saori Matsumoto, Hino (JP); Koji Sakai, Mitaka (JP); Hiroki Amino, Akiruno (JP); Yoshitaka Sato, Musashino (JP); Tsuyoshi Yaji, Kawagoe (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/660,495

(22) Filed: Mar. 17, 2015

(65) Prior Publication Data

US 2015/0334306 A1   Nov. 19, 2015

(30) Foreign Application Priority Data

May 19, 2014   (JP) .................................. 2014-103544

(51) Int. Cl.
*H04N 5/232*     (2006.01)
*H04N 5/225*     (2006.01)

(52) U.S. Cl.
CPC ..... *H04N 5/23216* (2013.01); *H04N 5/23203* (2013.01); *H04N 5/23206* (2013.01); *H04N 5/23293* (2013.01); *H04N 5/2252* (2013.01); *H04N 5/23245* (2013.01)

(58) Field of Classification Search
CPC ........... H04N 5/23216; H04N 5/23206; H04N 5/23203; H04N 5/23293; H04N 5/23245; H04N 5/2252
See application file for complete search history.

(56) References Cited

U.S. PATENT DOCUMENTS

| 2013/0178245 | A1* | 7/2013 | Kulas | .................. | H04M 1/0254 |
| | | | | | 455/556.1 |
| 2013/0203462 | A1* | 8/2013 | Tahk | ................... | G06F 3/04845 |
| | | | | | 455/556.1 |
| 2015/0334306 | A1* | 11/2015 | Sato | ................... | H04N 5/23293 |
| | | | | | 348/211.8 |

FOREIGN PATENT DOCUMENTS

JP        2012-185692        9/2012

* cited by examiner

*Primary Examiner* — Padma Haliyur
(74) *Attorney, Agent, or Firm* — John C. Pokotylo; Straub & Pokotylo

(57) ABSTRACT

An image pickup display apparatus includes: a communication section that is capable of receiving a picked-up image from an image pickup unit; a display section that displays the picked-up image received by the communication section; an operation section for controlling image pickup by the image pickup unit; a state determination section that determines a state of a case in which the communication section, the display section and the operation section are housed; and a control section that receives a result of determination performed by the state determination section, to change a user interface provided by the display section and the operation section based on whether or not the case is arranged on another object.

18 Claims, 14 Drawing Sheets

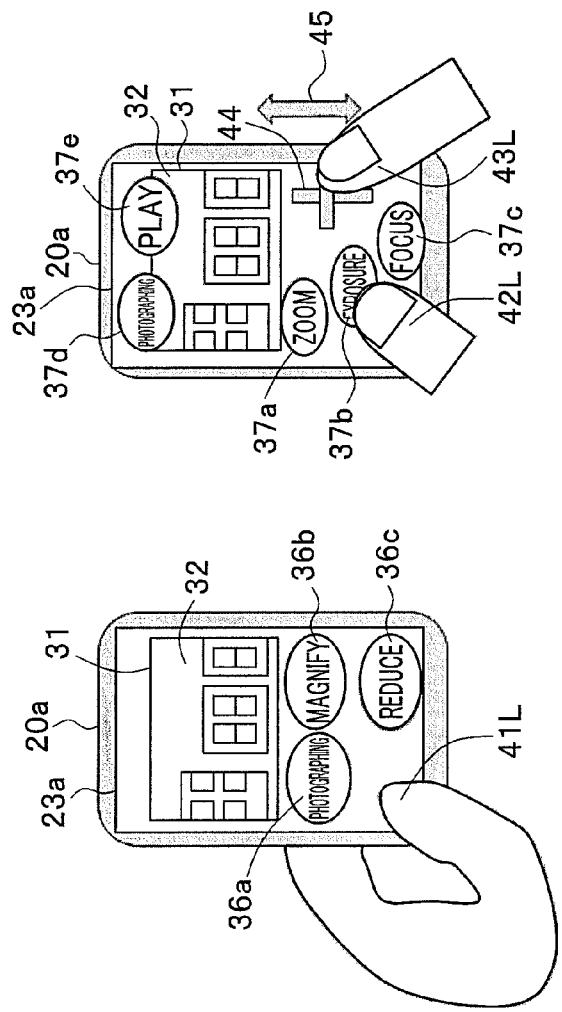
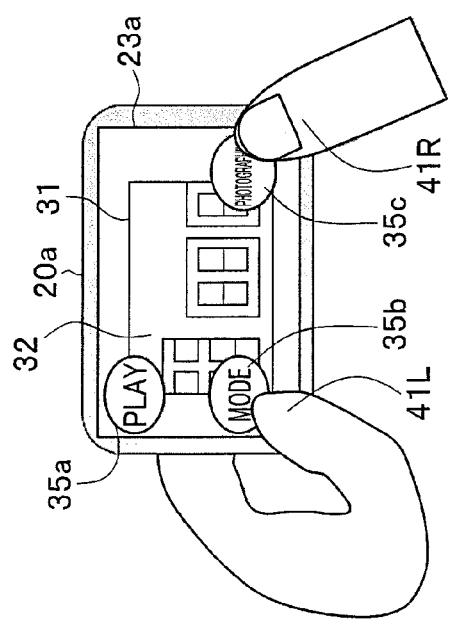
FIG. 3A  FIG. 3B  FIG. 3C

FIG. 4

|  |  | IMAGE PICKUP UNIT | |
| --- | --- | --- | --- |
|  |  | STATIONARY | HAND-HELD |
| IMAGE PICKUP DISPLAY APPARATUS | PLACED | BOTH HANDS TEN FINGERS | ONE HAND FIVE FINGERS |
|  | HAND-HELD | THUMB + ONE HAND FIVE FINGERS | THUMB |

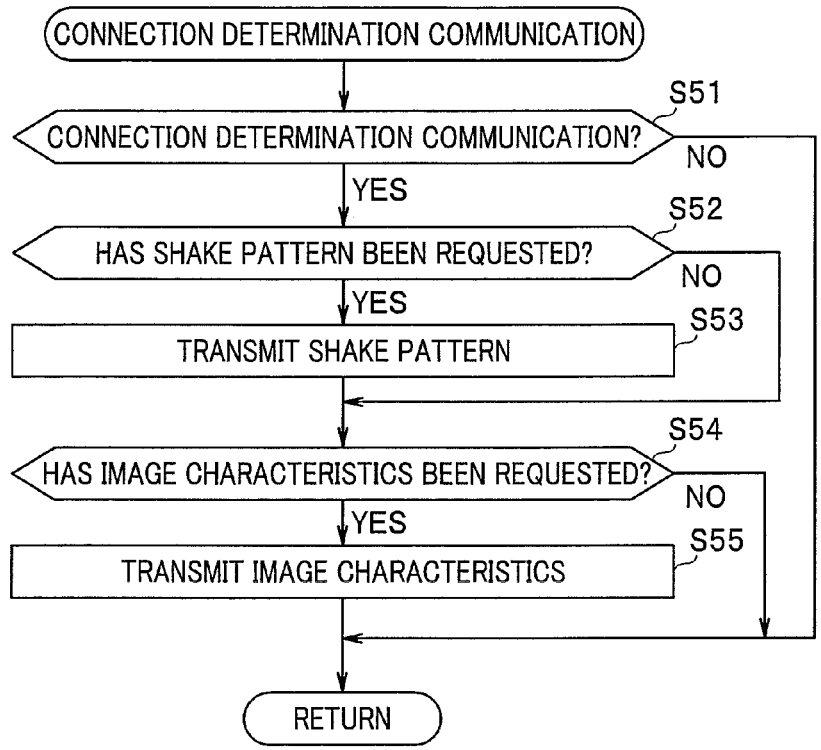
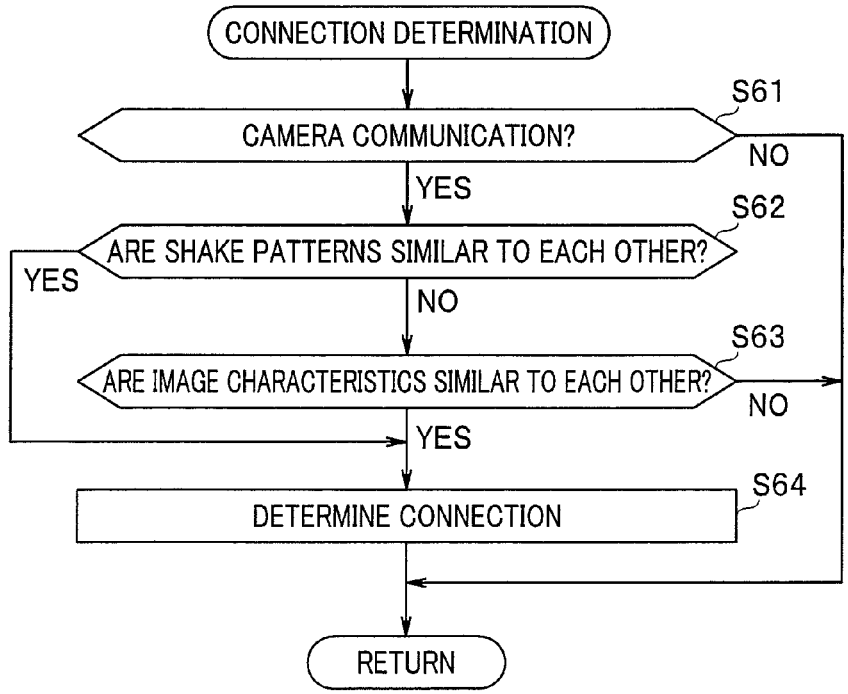

LENS-STYLE CAMERA

SMARTPHONE

T1  T2  T3  T4  T5  T6

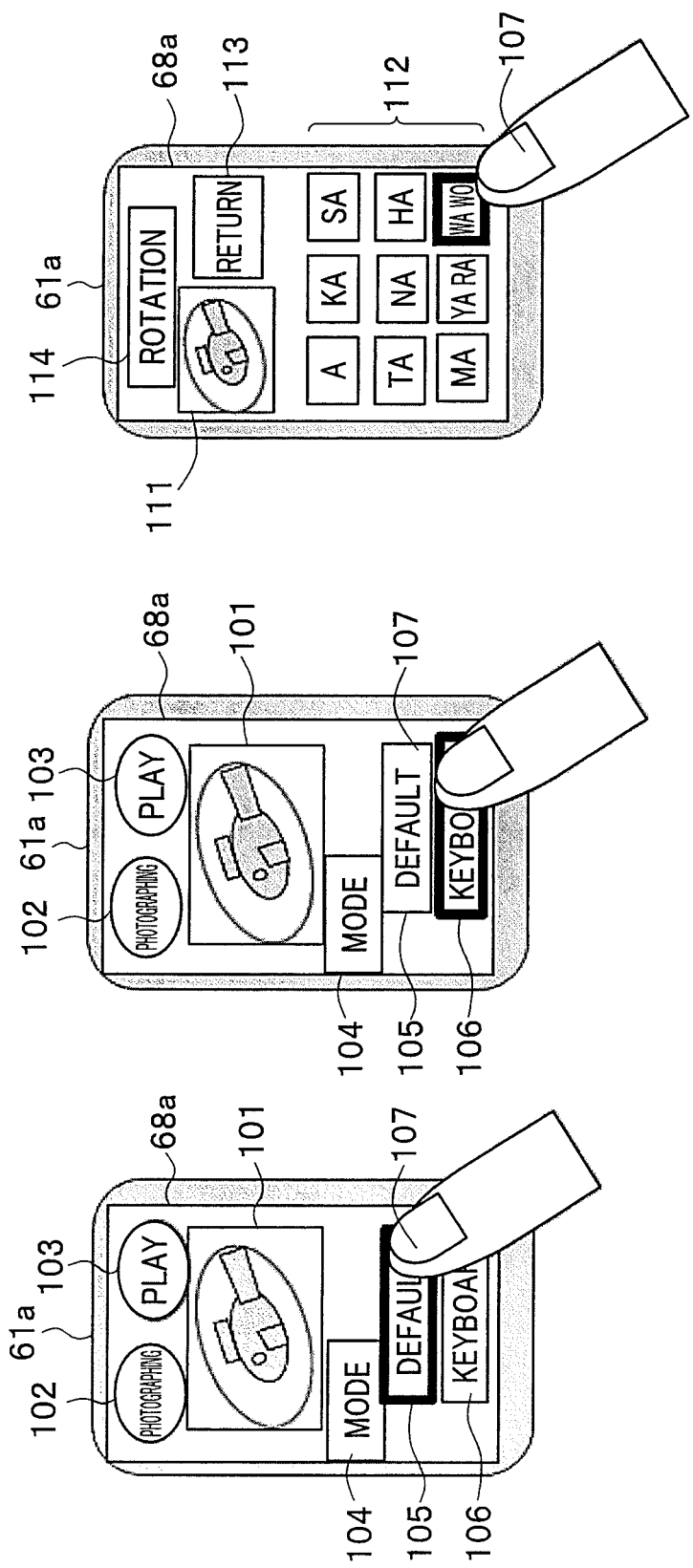

IMAGE PICKUP DISPLAY APPARATUS, IMAGE PICKUP DISPLAY METHOD, AND RECORDING MEDIUM

This application claims the benefit of Japanese Application No. 2014-103544 in Japan on May 19, 2014, the contents of which are incorporated by this reference.

BACKGROUND OF THE INVENTION

Field of the Invention

The present invention relates to an image pickup display apparatus that is capable of displaying an image from a separated image pickup unit, an image pickup display method, and a recording medium.

Description of Related Art

In recent years, mobile devices with a photographing function (photographing devices) such as digital cameras have become common. Some of such photographing devices have a display section and a function for displaying a photographed image on the display section. In addition, some of them display a menu screen on a display section to facilitate the operation of the photographing devices. Such a display section is commonly provided on a rear surface of a photographing device main body, and a user is able to perform a photographing operation while checking a through image displayed on the display section on the rear surface at the time of photographing.

In addition, in recent years, a lens-style camera, which does not have a display section for displaying a picked-up image but only has functions of photographing and recording, has sometimes been employed. A lens-style camera of this type is generally attached to a smartphone, a tablet PC, or the like, and photographing is controlled by using the smartphone, tablet PC, or the like to which the lens-style camera is attached as a control device. In addition, the control device such as a smartphone, tablet PC, or the like also functions as an image pickup display apparatus that displays a picked-up image from the lens-style camera.

Such a lens-style camera is attachable to and detachable from a smartphone, tablet PC, or the like, and is capable of photographing also in a state detached from the smartphone, tablet PC, or the like. In this case, the control device such as the smartphone, tablet PC, or the like is connected to the lens-style camera by wireless or wire communication, and the photographing operation of the lens-style camera is possible by using a touch panel, etc., provided on the display section.

Japanese Patent Application Laid-Open Publication No. 2012-185692 proposes a technique for connecting such a smartphone, tablet PC, or the like to a mobile computer apparatus, etc., by wire or wireless connection, and allowing the smartphone, tablet PC or the like to act for a function of a mouse which is input means for the computer apparatus.

Note that the lens-style camera is used in a state attached to the image pickup display apparatus that displays a picked-up image from the lens-style camera (attached state) in some cases, and used in a state detached from the image pickup display apparatus (non-attached state) in other cases, and it is considered that the usage patterns of the lens-style camera are significantly different in the attached state and in the non-attached state.

SUMMARY OF THE INVENTION

An image pickup display apparatus according to the present invention includes: a communication section that is capable of receiving a picked-up image from an image pickup unit; a display section that displays the picked-up image received by the communication section; an operation section for controlling image pickup by the image pickup unit; a state determination section that determines a state of a case in which the communication section, the display section and the operation section are housed; and a control section that receives a result of determination performed by the state determination section, to change a user interface provided by the display section and the operation section based on whether or not the case is arranged on another object. In some example embodiments, the state determination section determines that the case is arranged on the other object when an operation surface of the operation section is fixed so as to face upward. In some such embodiments, the state determination section determines that the case is arranged on the other object when vibration of the operation surface of the operation section in a vertical direction is smaller than a predetermined threshold.

Further, an image pickup display method according to the present invention includes: receiving, by a communication section, a picked-up image from an image pickup unit; displaying, by a display section, the picked-up image received by the communication section; determining, by a state determination section, a state of a case in which an operation section for controlling image pickup by the image pickup unit, the communication section, and the display section are housed; and receiving a result of determination performed by the state determination section, to change a user interface provided by the display section and the operation section, by a control section, based on whether or not the case is arranged on another object.

Furthermore, a non-transitory computer readable recording medium according to the present invention which stores a program for causing a computer to execute procedures of receiving, by a communication section, a picked-up image from an image pickup unit; displaying, by a display section, the picked-up image received by the communication section, determining a state of a case in which an operation section for controlling image pickup by the image pickup unit, the communication section, and the display section are housed; and changing a user interface provided by the display section and the operation section based on whether or not the case is arranged on another object.

The above and other objects, features and advantages of the invention will become more clearly understood from the following description referring to the accompanying drawings.

BRIEF DESCRIPTION OF THE DRAWINGS

FIGS. 3A to 3C are illustrative diagrams for describing working according to the first embodiment.

FIG. 4 is a chart showing an example of a correspondence relationship between a user interface and respective states of the image pickup display apparatus and the image pickup unit.

FIG. 9 is a flowchart showing an example of a specific working flow of a connection determination communication performed by the lens-style camera 51 in step S37 in FIG. 7.

FIG. 10 is a flowchart showing a flow of connection determination performed by a control section 65 using information obtained by the connection determination communication.

FIGS. 15A to 15C are illustrative diagrams for describing an example of display in the operation pattern 3.

DETAILED DESCRIPTION OF PREFERRED EMBODIMENTS

Hereinafter, detailed description will be made on embodiments of the present invention with reference to drawings.

First Embodiment

Figure 1:
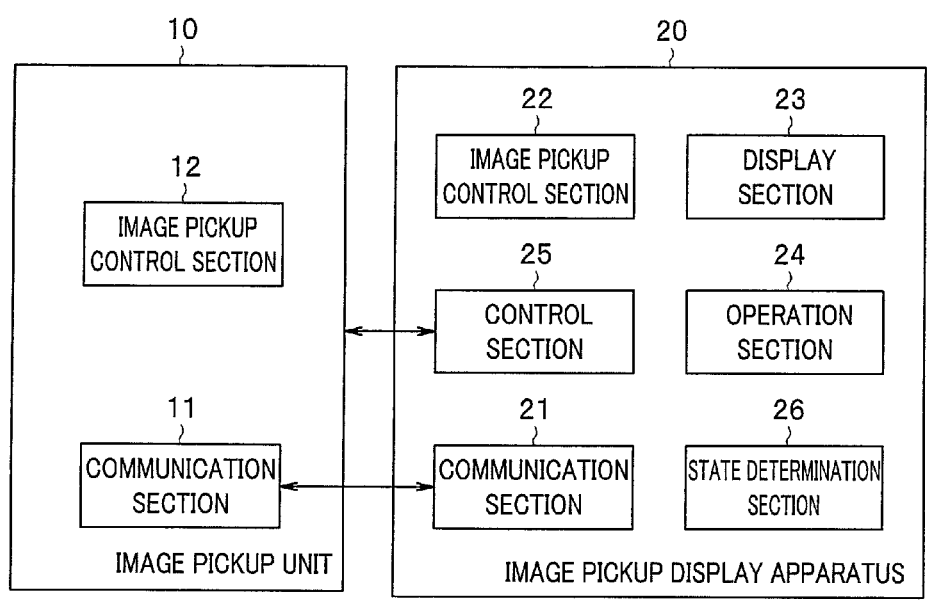
FIG. 1 is a block diagram showing a photographing system including an image pickup display apparatus according to a first embodiment of the present invention.

FIG. 1 is a block diagram showing a photographing system including an image pickup display apparatus according to the first embodiment of the present invention.

In FIG. 1, an image pickup unit 10 includes a communication section 11, and an image pickup display apparatus 20 includes a communication section 21. For example, the image pickup unit 10 can be configured by a lens-style camera, and the image pickup display apparatus 20 can be configured by a smartphone or a tablet PC. The communication section 11 and the communication section 21 can communicate with each other. The image pickup unit 10 and the image pickup display apparatus 20 communicate with each other with the communication sections 11, 21, to thereby capable of transmitting and receiving various kinds of information. Since information terminals such as recent smartphones and tablet PCs have also an image pickup unit, the term "information terminals" may be used instead of "image pickup display apparatus" as described above.

The image pickup unit 10 includes an image pickup device not shown. An image pickup control section 12 is configured to receive a control signal from the image pickup display apparatus 20 through the communication section 11, and to be able to control image pickup to be performed by the image pickup device. The communication section 11 is configured to be able to transmit a picked-up image obtained by the image pickup device to the communication section 21.

The image pickup display apparatus 20 includes an image pickup device not shown. An image pickup control section 22 is configured to be able to control image pickup by the image pickup device in the image pickup display apparatus 20. The image pickup display apparatus 20 includes a display section 23. The display section 23 is controlled by the control section 25, to display a picked-up image, a menu, and the like.

The control section 25 is capable of controlling image pickup performed by the image pickup unit 10 through the communication section 21, 11. In addition, the control section 25 performs predetermined image processing on the picked-up image transferred from the image pickup unit 10 through the communication sections 11 and 21, and thereafter can send the picked-up image subjected to the image processing to the display section 23 to cause the display section to display the picked-up image.

The image pickup display apparatus 20 is provided with an operation section 24. The operation section 24 can be configured by switches, buttons, and the like, not shown, for example, and outputs an operation signal based on a user operation performed on the operation section 24 to the control section 25. In addition, a touch panel, not shown, provided on a display screen of the display section 23 may be employed as the operation section 24.

The touch panel can generate an operation signal corresponding to a position which is pointed by the user with a finger on the display screen of the display section 23. The operation signal is supplied to the control section 25. Thus, when the user touches on or slides the display screen, the control section 25 is capable of detecting various operations, for example, the position touched by the user, operation for closing and then spreading two fingers (pinch operation), the sliding operation, the position reached by the sliding operation, the sliding direction, a period during which the user touches the display screen, etc., and capable of performing processing corresponding to the user operation. For example, touch operation enables various photographing operations in the image pickup unit 10 to be performed.

In the present embodiment, the image pickup display apparatus 20 includes a state determination section 26. The state determination section 26 can determine the state of the image pickup display apparatus 20 itself. For example, the state determination section 26 is capable of determining whether the image pickup display apparatus 20 is placed on a table or the like (placed state) or held by the user with a hand (held state). The state determination section 26 is configured by an acceleration sensor, a gyro sensor, or the like, for example, and capable of determining whether the image pickup display apparatus 20 is in the placed state or the held state based on the detection result obtained by any of these sensors.

In addition, the state determination section 26 may be configured to be able to determine the state of the image pickup unit 10. For example, the state determination section 26 determines whether the image pickup unit 10 is in a state disposed on a tripod stand, etc. (hereinafter, referred to as stationary state) or in a state held by the user with the hand (hereinafter, referred to as camera-held state), based on a picked-up image from the image pickup unit 10. For example, the state determination section 26 is capable of determining the stationary state and the camera-held state based on the movements of the respective image portions in the picked-up image from the image pickup unit 10.

Note that the state determination section 26 may determine the placed state and the held state of the image pickup display apparatus 20 based on the picked-up image obtained with the image pickup device of the image pickup display apparatus 20, and may determine the stationary state and the camera-held state of the image pickup unit 10 by using the detection signal from the acceleration sensor, the gyro sensor, or the like provided in the image pickup unit 10.

Furthermore, the state determination section 26 is configured to be able to determine whether the image pickup unit 10 is in a state attached to the image pickup display apparatus 20 (attached state) or in a state detached from the image pickup display apparatus 20 (non-attached state). These determination results by the state determination section 26 are supplied to the control section 25.

In accordance with the determination result by the state determination section 26, the control section 25 changes control for the display on the display section 23 and the operation signal corresponding to the display which is transmitted from the operation section 24, that is, a graphical user interface.

Figure 2:
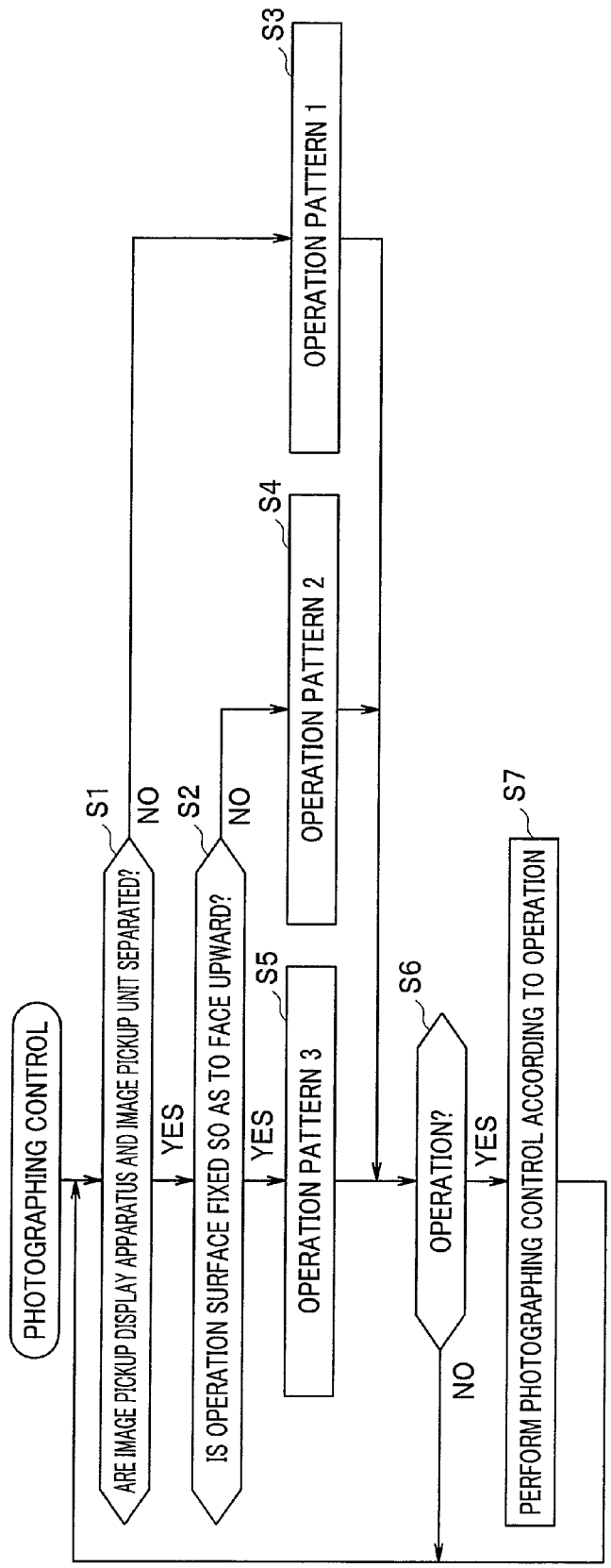
FIG. 2 is a flowchart for describing a photographing control.

Next, the working in the embodiment thus configured will be described with reference to FIG. 2 and FIGS. 3A to 3C. FIG. 2 is a flowchart for describing photographing control, and FIGS. 3A to 3C are illustrative diagrams for describing the working in the first embodiment.

The control section 25 of the image pickup display apparatus 20 controls the image pickup control section 12 of the image pickup unit 10 through the communication sections 21 and 11. The image pickup control section 12 is controlled by the control section 25 to drive the image pickup device of the image pickup unit 10. The picked-up image obtained by image pickup performed by the image pickup device is imported into the image pickup display apparatus 20 through the communication sections 11 and 21. The control section 25 of the image pickup display apparatus 20 performs predetermined signal processing on the imported picked-up image, and thereafter sends the image subjected to the predetermined signal processing to the display section 23 to cause the display section to display a through image.

The user can perform photographing operation while referring to the through image displayed on the display section 23. The control section 25 causes the display section 23 to perform operation display for photographing operation and the like. In this case, the control section 25 causes the display section to perform operation display according to the state determination result by the state determination section 26. The state determination section 26 determines at least one of the states of the image pickup display apparatus 20 and the image pickup unit 10, to output a state determination result to the control section 25.

For example, the state determination section 26 determines whether or not the image pickup display apparatus 20 and the image pickup unit 10 are separated from each other in step S1 in FIG. 2. When the image pickup unit 10 is attached to the image pickup display apparatus 20, the control section 25 selects a display form for an operation pattern 1 and performs operation control according to the operation pattern 1, based on the determination result by the state determination section 26 (step S3).

FIG. 3A shows a display in the operation pattern 1. FIG. 3A shows a state where the display section 23 is provided on the substantially entire area of an operation surface of a case 20a of the image pickup display apparatus 20. On a display screen 23a of the display section 23, an image display area 31 for displaying a picked-up image 32 is provided. In addition, on the display screen 23a, a play button 35a, a mode button 35b, and a photographing button 35c, which are operation icons, are displayed.

When the user touches on the play button 35a, the mode button 35b, or the photographing button 35c, the control section 25 causes the image pickup display apparatus 20 to shift to a play mode, a mode setting mode, or a photographing mode.

When the image pickup unit 10 is attached to the image pickup display apparatus 20, it is expected that the user usually holds the case 20a with both hands, and as shown in the example in FIG. 3A, the user performs touch operation with both fingers (the thumbs, for example), i.e., both of a finger 41L of the left hand and a finger 41R of the right hand. Since the operation using the fingers of the both hands is possible, the operation icons are arranged in arranging areas at up, down, right and left portions on the display screen 23a, as shown in FIG. 3A.

The state determination section 26 determines whether or not the operation surface of the image pickup display apparatus (device) 20 faces upward and fixed in an up/down direction. For example, when the image pickup display apparatus 20 is placed substantially horizontally on an object according to the gravitational force, determination is made on whether the image pickup display apparatus 20 is placed such that the operation surface (touch surface) faces in the direction opposite to the direction of the gravitational force. In the case where the image pickup display apparatus 20 is not fixed, for example, in the case where the user holds the image pickup display apparatus 20 with the left hand and holds the image pickup unit 10 with the right hand, the processing procedure proceeds from the step S2 to step S4, and the control section 25 performs display and control based on an operation pattern 2. Note that the expression "fixed" is used in the above description. However, it may be determined that the image pickup display apparatus is in the fixed state, if the screen faces in a constant direction and is not likely to vibrate in the direction. That is, the image pickup display apparatus is not necessarily fixed in fact. In addition, the above-described state can be called also as "on-the-desk placement", but a board on which the image pickup display apparatus is placed is not limited to a desk. The same operation can be performed also on the user's lap, and depending on a situation, the case where the user abuts the device on the wall and uses the device while sliding the device on the wall is also included in the above-described state. Even when the user uses the device in the above-described way, the wall functions as a support, which allows the user to use the device easily in some cases. The above-described way of using can be described as "on-the-surface shift arrangement", or "arranging on another object". That is, the state determination section 26 determines whether or not the image pickup display apparatus 20 is fixed to some extent on a surface of an object by the gravitational force, a pressing force of some sort, or the like, and the touch operation or the like on the operation surface is possible.

FIG. 3B shows a display in the operation pattern 2. A photographing button 36a, a magnify button 36b, and a reduce button 36c, which are operation icons, are displayed in an area other than the image display area 31 on the display screen 23a.

When the user touches on the photographing button 36a, the magnify button 36b, or the reduce button 36c, the control section 25 causes the image pickup display apparatus 20 to shift to a photographing mode, a magnify mode, or a reduce mode.

In the case of this display form, it is expected that the user usually holds the case 20a with one hand and holds the image pickup unit 10 with the other hand, and performs the touch operation only with the finger 41L of the left hand, for example, as shown in the example in FIG. 3B. Since the operation is performed using only the finger of the one hand, the operation icons are intensively arranged in the arranging area on the lower side on the display screen 23a, as shown in FIG. 3B.

It is now supposed that the image pickup display apparatus 20 is placed on a table in the state where the image pickup unit 10 is detached. In this case, the processing procedure proceeds from the step S2 to step S5. The control section 25 of the image pickup display apparatus 20 performs display and control based on an operation pattern 3.

FIG. 3C shows a display in the operation pattern 3. A zoom button 37a, an exposure button 37b, and a focus button 37c, which are operation icons, are displayed in an area other than the image display area 31 on the display screen 23a. In addition, also on the image display area 31, a photographing button 37d and a play button 37e are displayed.

When the user touches on the zoom button 37a, the exposure button 37b, the focus button 37c, the photographing button 37d, or the play button 37e, the control section 25 causes the image pickup display apparatus 20 to shift to a zoom mode, an exposure mode, a focus mode, a photographing mode, or a play mode.

In the case of this display form, it is expected that the user usually holds the image pickup unit 10 with one hand and places the image pickup display apparatus 20 on a table, and the user performs the touch operation with one hand, for example, with the fingers 42L, 43L or the like of the left hand, as shown in the example in the FIG. 3C. Since the operation using all the fingers of the one hand is possible, as shown in FIG. 3C, the operation icons are arranged in the arranging areas of the up, down, right and left portions on the display screen 23a, and the number of the operation icons are larger than that in FIG. 3B.

In addition, since the slide operation with the fingers is relatively easy in this case, a slide bar 44 is also displayed on the display screen 23a. The user performs the slide operation in the up/down direction shown with the arrow 45, thereby capable of setting various kinds of values.

When the control section 25 detects an operation for the display according to each of the operation patterns 1 to 3, the control section 25 performs photographing control according to the operation (step S7).

Note that the user interfaces shown in FIGS. 3A to 3C are examples, and various user interfaces can be set according to the states of the image pickup display apparatus 20 and the image pickup unit 10.

In addition, the flowchart shown in the above-described FIG. 2 shows the example in which the display form for accepting the user operation is changed based on whether or not the image pickup display apparatus is separated from the image pickup unit and placed on the table. However, the user interface may be configured to be changed depending on the respective states of the image pickup display apparatus and the image pickup unit.

For example, FIG. 4 is a chart showing an example of a correspondence relationship between the user interface and the respective states of the image pickup display apparatus and the image pickup unit.

The example shown in FIG. 4 indicates the number of hands and fingers which can be used for operation, depending on whether the image pickup display apparatus such as a smartphone is in the placed state or in the held state (hand-held state) and whether the image pickup unit such as a lens-style camera is in the stationary state or in the held state (hand-held state). The user interface may be appropriately set depending on the number of available hands and fingers.

The example in FIG. 4 indicates that, in the case where the image pickup unit 10 is in the hand-held state, when the image pickup display apparatus 20 is in the hand-held state, the image pickup display apparatus 20 is required to be operated only with the thumb, on the other hand, when the image pickup display apparatus 20 is placed on the table, the image pickup display apparatus 20 can be operated with five fingers of one hand. In addition, FIG. 4 indicates that, in the case where the image pickup unit 10 is in the stationary state, when the image pickup display apparatus 20 is in the hand-held state, the image pickup display apparatus 20 is required to be operated with the thumb of one hand and the five fingers of the other hand, on the other hand, when the image pickup display apparatus 20 is placed on the table, the image pickup display apparatus 20 can be operated with the ten fingers of the both hands.

Thus, in the present embodiment, a different user interface can be provided depending on the state of at least one of the image pickup display apparatus 20 and the image pickup unit 10, and the user can perform operation suitable for each of the states.

For example, when the image pickup unit 10 and the image pickup display apparatus 20 are used in a state separated from each other, the image pickup unit and the image pickup display apparatus can be used in a manner different from that in the case where the image pickup unit and the image pickup display apparatus are unified, and there are situations where effective photographing is possible by using the separated image pickup unit 10. For example, when an image of a dish is photographed, it is sometimes effective to photograph the dish not only from the front side but also from the opposite side toward the front side. The separated image pickup unit 10 can be used for photographing in such a situation. In this case, it is expected that the user holds the image pickup unit 10 such as a lens-style camera with one hand, and operates a tablet PC or the like as the image pickup display apparatus 20 with the other hand. However, if the user holds the image pickup display apparatus 20, the user has to hold the image pickup display apparatus and perform operation simultaneously with one hand, which results in unstable operation. Therefore, in such a case, it is more advantageous to use the image pickup display apparatus 20 in the state placed on a table or the like. In such a case, the present embodiment can provide a user interface which enables operation suitable for the placed state. This makes it relatively easy to operate the operation section 24 of the image pickup display apparatus 20, which allows the user to concentrate on other photographing operations such as setting of a composition. As a result, the user can perform stable photographing operation.

Second Embodiment

Figure 5:
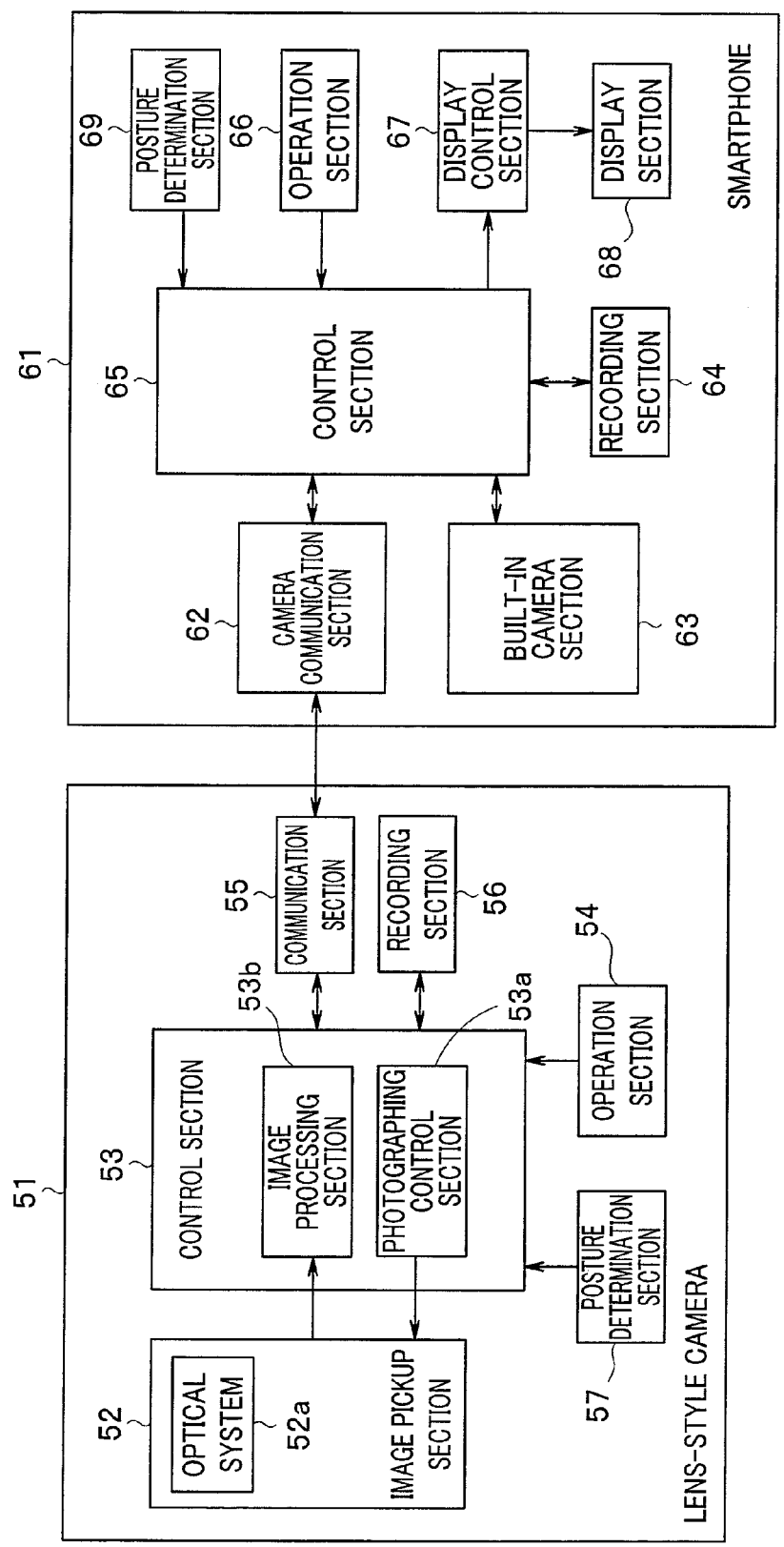
FIG. 5 is a block diagram showing a second embodiment of the present invention.
Figure 6:
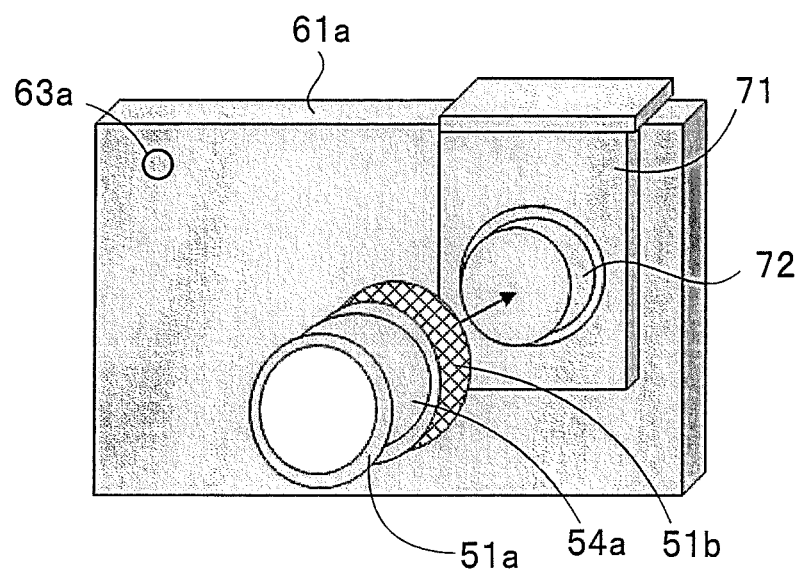
FIG. 6 is an illustrative diagram showing an appearance of the apparatus shown in FIG. 5.

FIG. 5 is a block diagram showing the second embodiment of the present invention, and shows an example in which a lens-style camera and a smartphone are employed as the image pickup unit and the image pickup display apparatus, respectively. FIG. 6 is an illustrative diagram showing an appearance of the apparatus shown in FIG. 5. Note that a tablet PC or a mobile phone may be employed instead of the smartphone.

In FIG. 5, a smartphone 61 corresponding to the image pickup display apparatus 20 is provided with a camera communication section 62, a lens-style camera 51 corresponding to the image pickup unit 10 in FIG. 1 is provided with a communication section 55, and the smartphone 61 and the lens-style camera 51 are configured to be able to communicate with each other through respective communication sections 62 and 55.

As shown in FIG. 6, a case 61a of the smartphone 61 is configured such that an attaching instrument 71 is detachably attached thereto, and the attaching instrument 71 is provided with an attaching portion 72 for attaching the lens-style camera 51. The lens-style camera 51 includes on a base end side thereof an attaching portion 51*b* which is configured to be attached to the attaching portion 72 of the attaching instrument 71 by fitting, screwing, or the like.

The lens-style camera 51 is provided with an image pickup section 52 having an optical system 52*a*. The image pickup section 52 is provided with an image pickup device, not shown, configured by a CCD, a CMOS sensor, or the like, and an object image is guided onto an image pickup surface of the image pickup device by the optical system 52*a*. The optical system 52*a* includes, in a lens barrel 51*a*, a focus lens which is movable for setting a focus (focusing) state by focusing, and a zoom lens whose power is varied in the focus state. In addition, the optical system 52*a* includes a mechanical portion, not shown, which drives these lenses and a diaphragm. A control section 53 is configured to control the mechanical portion of the optical system 52*a* to drive the focus lens, zoom lens and diaphragm.

The lens-style camera 51 is provided with an operation section 54 such as an operation ring 54*a* for performing setting operation of parameters for photographing by a user, for example, parameters related to focusing, zooming and diaphragm. The control section 53 detects the user operation performed on the operation section 54, to perform control based on a result of the detection. The control section 53 is configured by a CPU and the like, and controls the respective sections of the lens-style camera 51 based on the user operation performed on the operation section 54 and a signal from the smartphone 61 to be described later.

A photographing control section 53*a* generates a focus signal, a zoom signal, and a diaphragm control signal, to drive and control the focusing, zooming and diaphragm of the optical system 52*a*. In addition, the photographing control section 53*a* supplies a driving signal to the image pickup device to control the image pickup of the object.

An image processing section 53*b* receives a picked-up image from the image pickup device, and performs predetermined image signal processing, for example, color adjustment processing, matrix conversion processing, noise removal processing, and other various kinds of signal processing on the picked-up image, and thereafter sends the image subjected to the image signal processing to a recording section 56 and enables the recording section to record the image. As the recording section 56, an IC memory can be employed, for example. In addition, the image processing section 53*b* is configured to be able to transfer the picked-up image to the smartphone 61 through the communication section 55.

The communication section 55 can communicate with the camera communication section 62 provided in the smartphone 61 through a predetermined transmission channel. As the transmission channel, various wired and wireless transmission channels, for example, a USB (Universal Serial Bus) cable, a transmission channel for wireless LAN such as Wifi (Wireless Fidelity) can be employed. When communication is established between the lens-style camera 51 and the smartphone 61, the control section 53 is able to control the photographing in accordance with the control section 65 of the smartphone 61 and transfer the picked-up image and information related to the lens to the smartphone 61.

In the present embodiment, the lens-style camera 51 is provided with a posture determination section 57. The posture determination section 57 is configured by a three-axis acceleration sensor, a gyro sensor, or the like, and sends information such as the posture, rotation angle, etc., of the lens-style camera 51 to the control section 53. Note that the posture determination section 57 may use a geomagnetic sensor together with the above-described sensor. The control section 53 is configured to be able to transmit the information (posture determination result) from the posture determination section 57 to the smartphone 61 through the communication section 55.

The smartphone 61 includes a built-in camera section 63. The built-in camera section 63 includes an image pickup device, not shown, which is configured by a CCD, a CMOS sensor, or the like, and configured such that the optical image of the object entered through a lens 63*a* (see FIG. 6) is guided to an image pickup surface of the image pickup device.

The control section 65 of the smartphone 61 is configured by a processor such as a CPU, for example, and controls the respective sections of the smartphone 61. The control section 65 controls the built-in camera section 63 and outputs a signal for driving the image pickup section 52 of the lens-style camera 51. The control section 65 receives a picked-up image from the built-in camera section 63, and also receives a picked-up image from the lens-style camera 51. The control section 65 performs predetermined signal processing, for example, color adjustment processing, matrix conversion processing, noise removal processing, and other various kinds of signal processing on the picked-up image from the built-in camera section 63 and the picked-up image received from the lens-style camera 51.

The smartphone 61 is also provided with an operation section 66. The operation section 66 is configured by various kinds of operation sections such as switches, keys, software keyboard, or the like, which are not shown, provided to the smartphone 61, and configured to generate an operation signal based on a user operation, and output the generated operation signal to the control section 65. The control section 65 controls the respective sections based on the operation signal.

The control section 65 is capable of performing processing related to recording and playing of the picked-up image. For example, the control section 65 is capable of performing compression processing on the picked-up image subjected to the signal processing, transmitting the compressed image to a recording section 64, and causing the recording section to record the image. As the recording section 64, various kinds of recording media such as an IC memory can be employed, and the recording section 64 is capable of recording image information, voice information, and the like in the recording medium.

A display control section 67 performs various kinds of processing related to display. The display control section 67 receives the picked-up image subjected to the signal processing from the control section 65, and is capable of sending the received image to a display section 68. The display section 68 has a display screen such as an LCD, and displays the image received from the display control section 67. Furthermore, the display control section 67 is capable of causing the display section 68 to display various menus on the display screen. The control section 65 is capable of reading the picked-up image recorded in the recording section 64 and performing expansion processing on the read picked-up image. The display control section 67 sends the picked-up image subjected to the expansion processing to the display section 68, thereby capable of playing the recorded image.

Also a touch panel, not shown, is provided as the operation section 66 on the display screen of the display section 68. The touch panel is capable of generating an operation signal corresponding to a position on the display screen indicated by the user with a finger. The operation signal is supplied to the control section 65. Thus, when the user touches on or slides the display screen, the control section 65 is capable of detecting various operations, for example, the position touched by the user, operation for closing and spreading two fingers (pinch operation), the sliding operation, the position reached by the sliding operation, the sliding direction, a period during which the user touches the display screen, etc., and capable of performing processing corresponding to the user operation.

Note that the display section 68 is disposed so as to cover the substantially entire area of the operation surface of the smartphone 61, for example, and the user is capable of checking the picked-up image displayed on the display screen of the display section 68 at the time of photographing with the lens-style camera 51, and performing photographing operation while checking the picked-up image.

Furthermore, in the present embodiment, the smartphone 61 includes a posture determination section 69. The posture determination section 69 is configured by a three-axis acceleration sensor, a gyro sensor, or the like, and sends information on the posture of the smartphone 61 to the control section 65. Note that, the posture determination section 69 may use a geomagnetic sensor together with the above-described sensor.

The control section 65 is configured to change the operation interface based on at least one of the information (posture determination result) from the posture determination section 69 and the information on the posture determination result of the lens-style camera 51 received from the lens-style camera 51 through the camera communication section 62. That is, in the present embodiment, the graphical user interface provided by the display section 68 and the operation section 66 configured by the touch panel is controlled so as to be changed according to at least one of the states of the lens-style camera 51 and the smartphone 61, based on the determination result from the posture determination sections 57 and 69.

Figure 7:
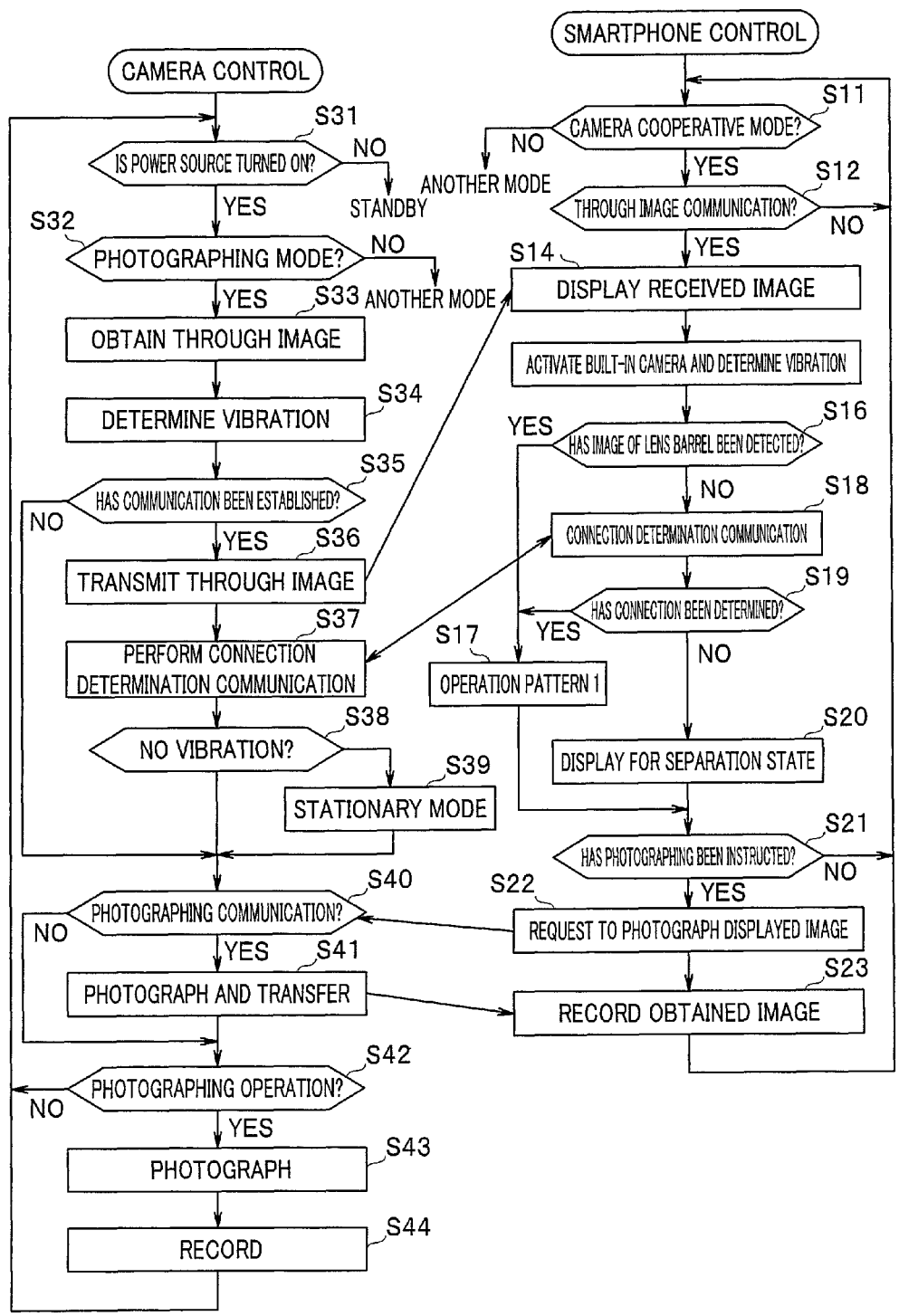
FIG. 7 is a flowchart for describing a camera control in a lens-style camera 51 and a control of a smartphone 61.

Next, description will be made on the working of the present embodiment thus configured, with reference to FIG. 7 to FIGS. 16A-16D. FIG. 7 is a flowchart for describing the camera control in the lens-style camera 51 and the control of a smartphone 61. Note that, in FIG. 7, the arrows connecting the camera control flow of the lens-style camera 51 and the control flow of the smartphone 61 indicate that communication is performed by processing.

The control section 53 of the lens-style camera 51 determines whether or not the power source is turned on in step S31. When the power source is turned on, the control section 53 determines whether or not the photographing mode is specified (step S32). When the photographing mode is specified, the control section 53 controls the image pickup section 52 to cause the image pickup section to pick up an image of an object. The picked-up image obtained by the image pickup section 52 is imported by the control section 53 and a through image is obtained (step S33). In addition, the control section 53 obtains the posture determination result by the posture determination section 57, for example, the determination result of vibration in step S34.

On the other hand, the control section 65 of the smartphone 61 determines whether or not a camera cooperative mode is specified in step S11. When the camera cooperative mode is specified, the control section 65 communicates with the lens-style camera 51 and generates a request for receiving a through image from the lens-style camera 15 in step S12.

Upon receiving the request for the through image from the smartphone 61, the control section 53 of the lens-style camera 51 establishes communication in step S35, and thereafter transmits the through image to the smartphone 61 through the communication section 15 (step S36). The control section 65 of the smartphone 61 receives the through image from the lens-style camera 51, sends the received through image to the display control section 27 to cause the through image to be displayed in step S14.

Next, the control section 65 determines at least one of the states of the smartphone 61 and the lens-style camera 51 in order to provide a graphical user interface optimal for the photographing operation. For example, the control section 65 causes the built-in camera section 63 to be activated and performs vibration determination using the output from the posture determination section 69 in step S15. Next, in step S16, the control section 65 detects whether or not an image of a lens barrel constituting the lens-style camera 51 is included in the picked-up image from the built-in camera section 63. When the lens barrel image is included, the control section 65 determines that the lens-style camera 51 is in the attached state, and sets the operation pattern 1 (step S17).

Figure 8:
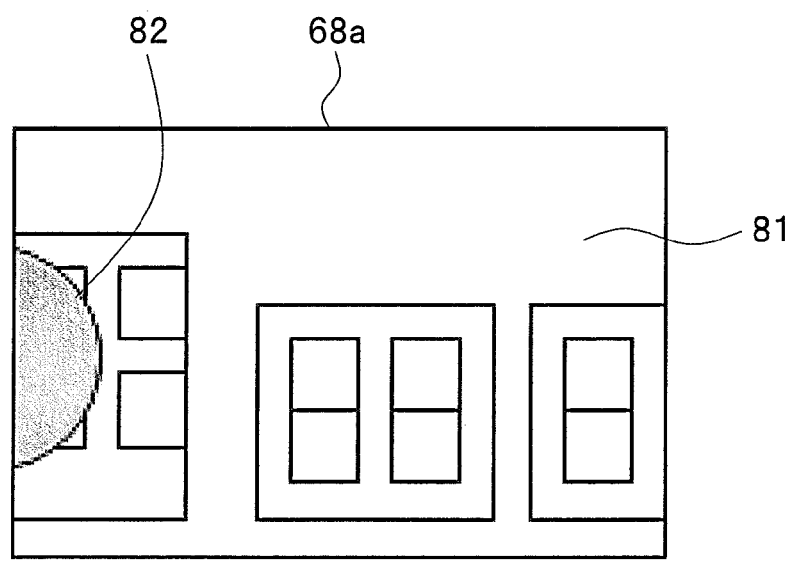
FIG. 8 is an illustrative diagram showing an example of a picked-up image from a built-in camera section 63.

FIG. 8 is an illustrative diagram showing an example of the picked-up image from the built-in camera section 63. FIG. 8 shows a state where a picked-up image 81 obtained by the built-in camera section 63 is displayed on the display screen 68a of the display section 68. A lens barrel image 82 is included in the end portion of the picked-up image 81. An image of the lens barrel 51a of the lens-style camera 51 is sometimes picked up by the built-in camera section 63, depending on the attaching position of the lens-style camera 51, the position of the lens 63a, and the like. The control section 65 detects whether or not the barrel image 82 is included in the picked-up image by image processing, and is capable of determining that the lens-style camera 51 is attached to the smartphone 61 when the barrel image 82 is included in the picked-up image.

Furthermore, when the barrel image is not included in the picked-up image, the control section 65 cannot determine whether or not the lens-style camera 51 is in the attached state based only on the picked-up image from the built-in camera section 63. Therefore, the control section 65 performs communication for connection determination with respect to the lens-style camera 51 in step S18. Also the lens-style camera 51 performs communication for connection determination in step S37.

FIG. 9 is a flowchart showing an example a specific working flow of the connection determination communication performed by the lens-style camera 51 in the step S37 in FIG. 7. Furthermore, FIG. 10 is a flowchart showing a flow of the connection determination performed by the control section 65 using information obtained by the connection determination communication.

The control section 53 of the lens-style camera 51 determines whether or not a request for connection determination communication is generated in step S51 in FIG. 9, and determines whether or not the generated request is a request for shake pattern in step S52. When determining that the request for shake pattern is generated, the control section 53 transmits information on the shake pattern which is information on vibration of the lens-style camera 51 based on the output from the posture determination section 57 (step S53).

On the other hand, the control section 65 of the smartphone 61 determines a presence or absence of the camera communication between the smartphone 61 and the lens-style camera 51 in step S61 in FIG. 10, to receive information on the shake pattern from the lens-style camera 51. The control section 65 determines similarity between the received shake pattern and the vibration determination result (shake pattern) of the smartphone 61 obtained in the step S15, and when determining that the shake patterns are similar to each other, the control section 65 shifts the processing to step S64 and when determining that there is no similarity, the control section 65 shifts the processing to step S63.

Figure 11A:
FIG. 11A and FIG. 11B are illustrative diagrams for describing similarity determination of shake patterns.
Figure 11B:

FIG. 11A and FIG. 11B are illustrative diagrams for describing the similarity determination of the shake patterns. FIG. 11A shows the shake pattern of the lens-style camera 51, and FIG. 11B shows the shake pattern of the smartphone 61. The control section 65 calculates changes in values of the respective shake patterns for each of the timings T1, T2, . . . in FIG. 11A and FIG. 11B, for example. The control section 65 determines whether or not the changes are similar to each other. When the changes in the values of the both shake patterns are similar to each other, the control section 65 determines that the lens-style camera 51 is connected to the case 61a of the smartphone 61 (step S64). In addition, when the changes in the values of the both shake patterns are not similar to each other, the control section 65 shifts the processing to the step S63. In the step S63, the control section 65 requests transmission of image characteristics of the picked-up image obtained by the lens-style camera 51.

The control section 53 of the lens-style camera 51 determines whether or not the request for the image characteristics has been generated in step S54 in FIG. 9. When the request for the image characteristics has been generated, the control section 53 transmits information on the image characteristics to the smartphone 61 in step S55.

When receiving the information on the image characteristics from the lens-style camera 51, the control section 65 determines similarity between the received information on the image characteristics and information on image characteristics acquired from the picked-up image obtained with the built-in camera section 63. When the information on these image characteristics are similar to each other, the control section 65 determines that the field of view of the lens-style camera 51 is similar to that of the built-in camera section 63, and the lens-style camera 51 is connected to the case 61a of the smartphone 61 (step S64). When determining that there is no similarity in the shake patterns and in the image characteristics, the control section 65 determines that the lens-style camera 51 is not connected to the case 61a of the smartphone 61.

When determining the connection in the step S19 in FIG. 7, the control section 65 shifts the processing to the step S17 to set the operation pattern 1, and when determining that there is no connection, the control section 65 shifts the processing to the step S20 to perform display for separation state. Note that the control section 53 of the lens-style camera 51 determines in step S38 whether or not the lens-style camera 51 vibrates based on the output from the posture determination section 57, that is, determines whether vibration of the lens-style camera 51 is generated due to the lens-style camera 51 being held with the hand, or no vibration is generated due to the lens-style camera 51 being placed on a table or the like. When determining that the vibration of the lens-style camera is not generated, the control section 53 sets a stationary mode in step S39, and transmits the determination result regarding whether or not the lens-style camera is in the stationary state to the smartphone 61.

In the operation pattern 1 in the step S17 in FIG. 7, the display and the operation control shown in FIG. 3A are performed, for example. On the other hand, in the display for separation state in the step S20, the user interface same as that in the operation patterns 2 and 3 shown in FIGS. 3B and 3C are set, for example.

Figure 12:
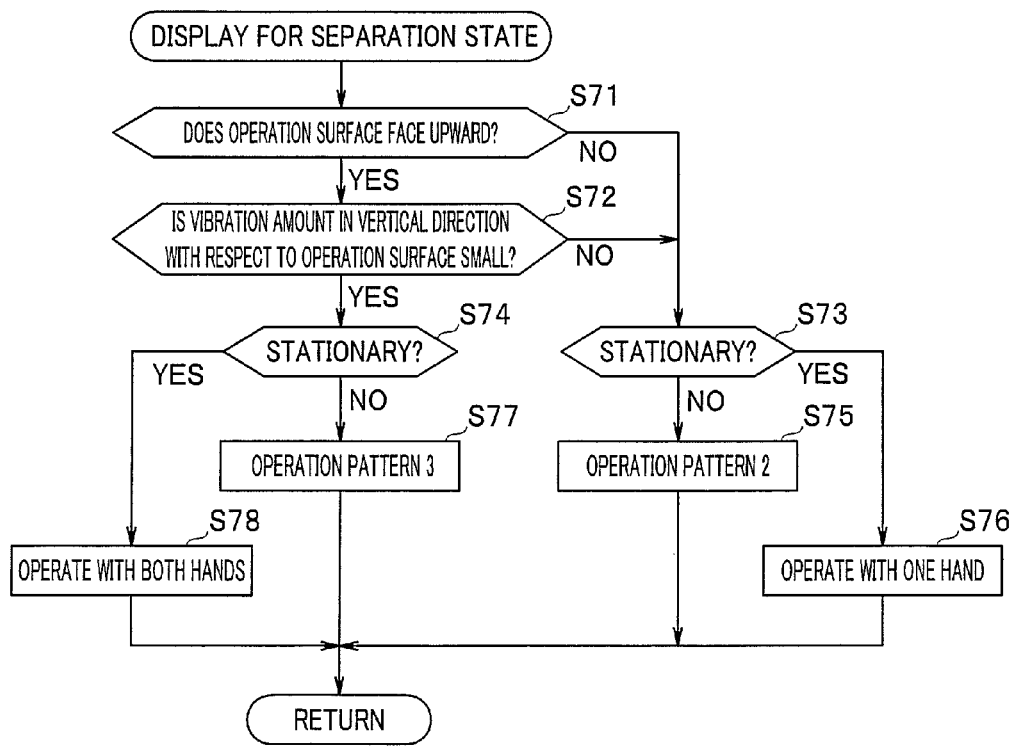
FIG. 12 is a flowchart showing a working flow of a display for separation state in step S20 in FIG. 7.

FIG. 12 is a flowchart showing the working flow of the display for separation state in the step S20 in FIG. 7. The control section 65 determines whether or not the operation surface faces in the upward vertical direction, that is, whether the user holds the smartphone 61 with the hand in step S71 in FIG. 12, and determines whether the vibration amount in the vertical direction with respect to the operation surface is smaller than a predetermined threshold, that is, determines whether or not the smartphone 61 is placed on a table or the like in step S72. When at least one of the determination results in the step S71 and step S72 is "NO", the control section 65 determines that the smartphone 61 is held with the hand, to shift the processing to step S73, and when both of the determination results in the step S71 and step S72 are "YES", the control section 65 determines that the smartphone 61 is placed on a table or the like, to shift the processing to step S74.

In the step S73 and step S74, the control section 65 determines whether or not the lens-style camera 51 is in the stationary state. When determining that the smartphone 61 is in the hand-held state and the lens-style camera is also in the hand-held state, the control section 65 shifts the processing to step S75. In this case, since both hands of the user are occupied for holding the smartphone and the lens-style camera, the control section 65 sets the operation pattern 2 shown in FIG. 3B, for example (step S75).

When determining that the smartphone 61 in the hand-held state and the lens-style camera is in the stationary state, the control section 65 shifts the processing to step S76. In this case, since only one hand of the user is occupied for holding the smartphone, operation of the smartphone 61 using all the fingers of the other hand which does not hold the smartphone 61 is possible, and the control section 65 sets the user interface suitable for the operation.

In addition, when determining that the smartphone 61 is in the placed state and the lens-style camera is in the hand-held state, the control section 65 shifts the processing to step S77. In this case, since one hand of the user is occupied for holding the lens-style camera, the control section 65 sets the operation pattern 3 shown in FIG. 3C, for example (step S77).

Furthermore, when determining that the smartphone 61 is in the placed state and also the lens-style camera is in the stationary state, the control section 65 shifts the processing to step S78. In this case, since both hands of the user are not occupied for holding the smartphone and the lens-style camera, operation of the smartphone 61 using all the fingers of both hands is possible, and the control section 65 sets the user interface suitable for the operation.

In the step S21 in FIG. 7, the control section 65 determines whether or not an instruction for photographing has been given by the user. When the photographing operation is performed, the control section 65 requests the lens-style camera 51 to photograph the image displayed as the through image (step S22). The control section 53 of the lens-style camera 51 determines whether or not communication for instructing the photographing is performed in step S40, performs photographing in accordance with the instruction from the control section 65 of the smartphone 61, and transfers the picked-up image to the smartphone 61 (step S41). The control section 65 performs signal processing on the picked-up image from the lens-style camera 51, and thereafter transmits the signal-processed image to the recording section 64, to cause the recording section 64 to record the image (step S23).

The control section 53 of the lens-style camera 51 also determines whether or not the instruction for photographing has been given by operating the operation section 54 of the lens-style camera 51 (step S42). When the instruction for photographing is given by the operation section 54, the control section 53 performs photographing in step S43, and then causes the recording section 56, for example, to record the picked-up image (step S44).

Figure 13A:
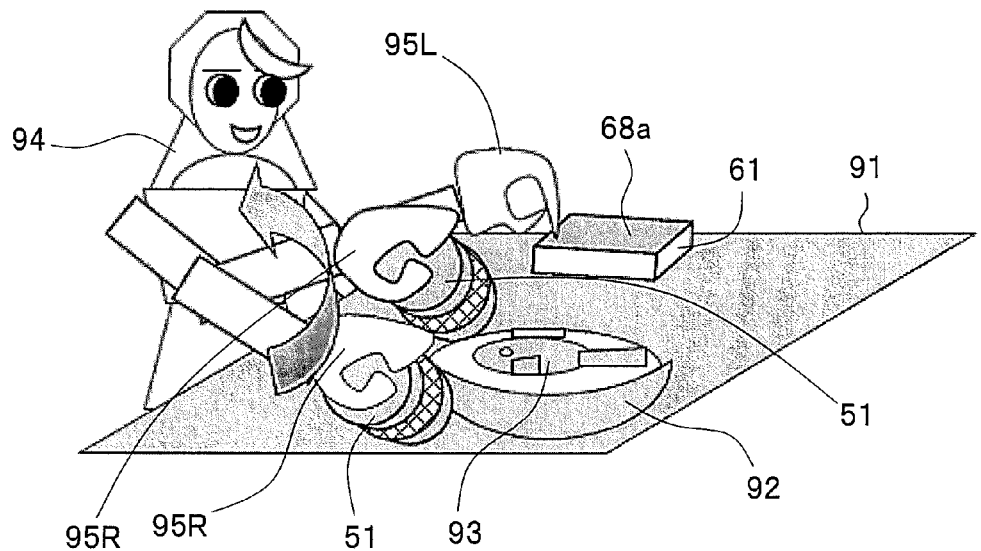
FIG. 13A and FIG. 13B are illustrative diagrams showing a state of photographing.
Figure 13B:
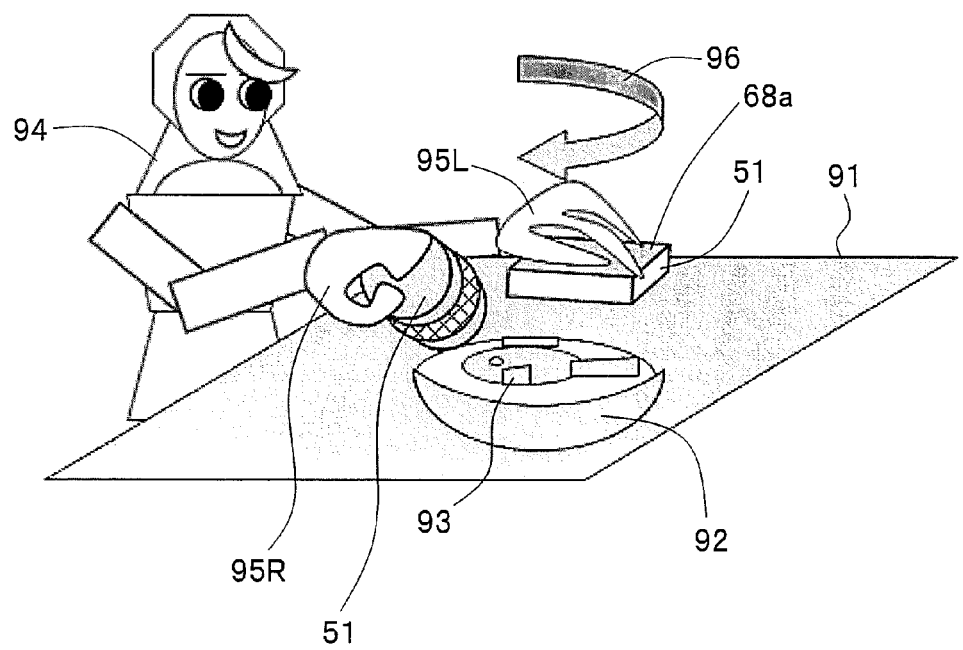

Next, as an example of use in the present embodiment, description will be made on an example in which a dish is photographed with reference to FIG. 13A, FIG. 13B, and FIG. 14 to FIGS. 16A-16D. FIGS. 13A and 13B are illustrative diagrams for describing a state of photographing. In FIGS. 13A and 13B, a serving plate 92 is placed on a table 91, and a fish dish 93 is on the serving plate 92. A user 94 holds the lens-style camera 51 with a right hand 95R. The smartphone 61 is placed on the table 91, with the display screen 68a facing upward. In this case, the state of the smartphone corresponds to the state expressed as what is called "on-the-surface arrangement" or "on-the-desk placement". However, if the screen faces in a constant direction and is not likely to vibrate in the direction, the state may be determined as the above-described state, and the smartphone is not necessarily fixed and the board on which the smartphone is placed is not limited to the table shown in the drawing or a desk. The same operation can be performed also on the user's lap, and depending on a situation, there is case where the user uses the smartphone while abutting the smartphone on the wall. The case where the user uses the smartphone while sliding the smartphone along the surface of the wall is also included in the above-described state. Even when the user uses the smartphone in the above-described way, the surface functions as a support, which allows the user to use the smartphone easily in some cases. That is, the above-described way of using can be described as "on-the-surface shift arrangement", or "arranging on another object". That is, the smartphone 61 is fixed to some extent on a surface of an object by the gravitational force, a pressing force of some sort, or the like, and the touch operation on the display screen 68a is possible.

The user 94 can check the through image displayed on the display screen 68a of the smartphone 61 while moving the right hand 95R which holds the lens-style camera 51. The user 94 tries to determine the composition by appropriately moving the right hand 95R while checking the through image. The arrow in FIG. 13A indicates that the user shifts the right hand 95R to arrange the lens-style camera 51 at various positions.

As shown in FIG. 13A, when photographing the dish, if the smartphone 61 having the display section 68 is placed on the table 91, the user 94 has only to look at one location where the display screen 68a is positioned even when the user aims at an object with the lens-style camera 51 from various angles. If the user 94 decides the composition by referring to the image on the display screen 68a, the user 94 then has only to perform camera operation by performing touch operation on the display screen 68a with a left hand 95L, as shown in FIG. 13B. In this case, since the smartphone 61 is placed on the table 91, the user 94 does not have to support the smartphone 61, which enables the user to easily support the lens-style camera 51.

That is, the examples shown in FIGS. 13A and 13B can provide the user interface in the above-described operation pattern 3. In this case, the control section 65 of the smartphone 61 performs control in the operation pattern 3 in accordance with the working flow shown in FIG. 14, for example FIGS. 15A to 15C are illustrative diagrams for describing an example of the display in this case.

Figure 14:
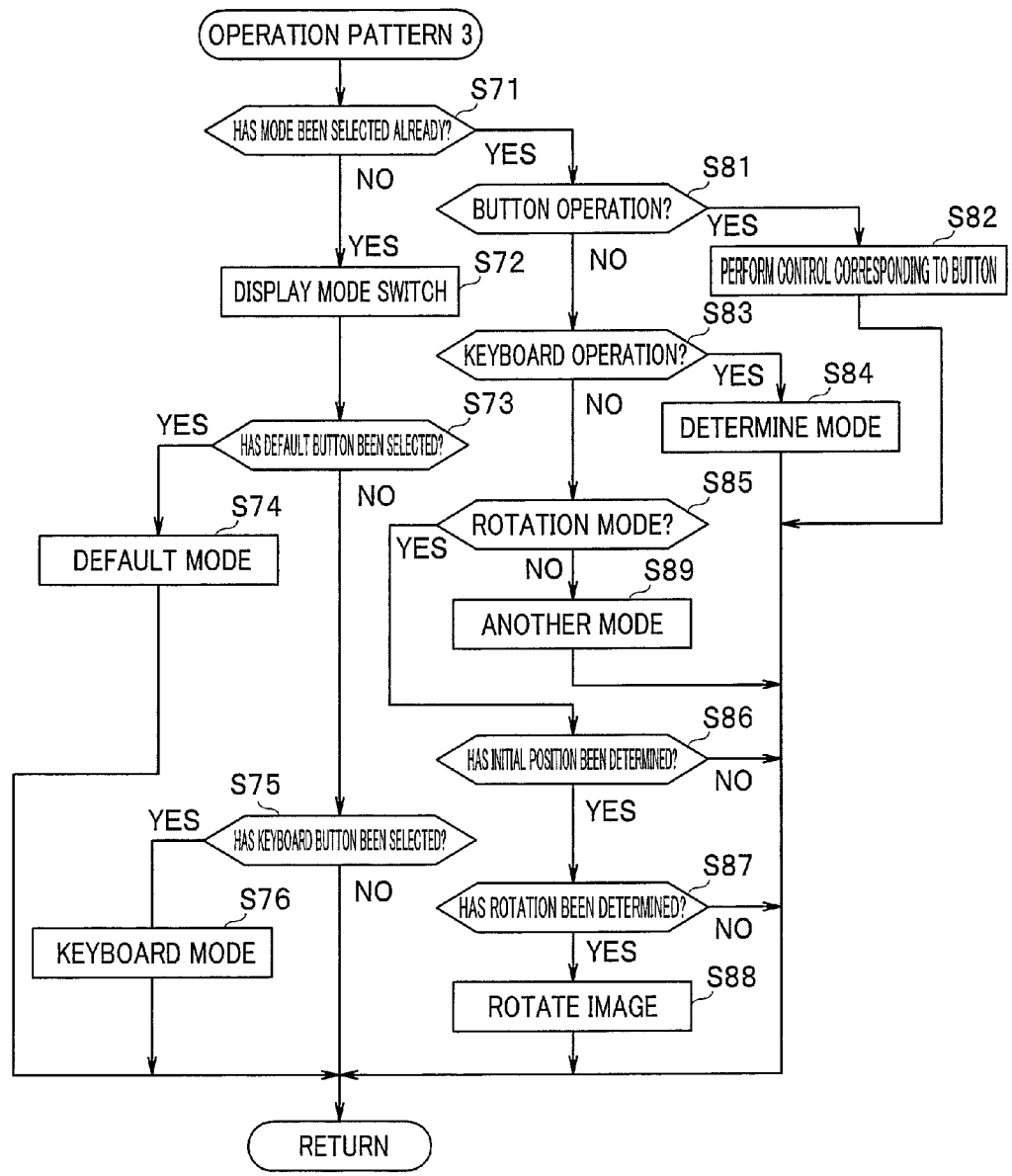
FIG. 14 is a flowchart showing an example of control in an operation pattern 3.

In step S71 in FIG. 14, the control section 65 determines whether or not an input mode has already been selected. Examples shown in FIG. 14 and FIGS. 15A to 15C show two input modes including a default mode and a keyboard mode in which software keyboard is displayed are possible, and determination is made on whether or not these input modes are specified in the step S71.

When the input mode is not selected, the control section 65 displays, in step S72, a mode switch (SW) for selecting the input mode. FIGS. 15A and 15B show such a state, and on the display screen 68a provided on the operation surface side of the case 61a of the smartphone 61, a default button 105 and a keyboard button 106 are displayed as the mode switch (SW) for the user to specify either the default mode or the keyboard mode. Note that, as shown in FIGS. 15A and 15B, a picked-up image 101 received from the lens-style camera 51 is displayed on the display screen 68a. In addition, also a photographing button 102 and a play button 103 are displayed on the display screen 68a.

When the user touches on the photographing button 102 or the play button 103 with a finger 107, the control section 65 instructs the lens-style camera 51 to perform photographing or playing. In addition, when the user touches on the default button 105 or the keyboard button 106 with the finger 107, the control section 65 sets the interface to the default mode or the keyboard mode. FIGS. 15A and 15B show the state where the user touches the buttons 105 and the state where the user touches the button 106, respectively, by displaying the frames of the respective buttons with thick frames.

When the user selects the default button 105 with the finger 107, the control section 65 shifts the processing from the step S73 to the step S74, to set the default mode. In this case, the display and operation control shown in FIG. 3C are performed, for example. In addition, when the user selects the keyboard button 106 with the finger 107, the control section 65 shifts the processing from the step S73 to step S75, to set the keyboard mode. In this case, the display and operation control shown in FIG. 15C are performed, for example.

The user interface shown in FIG. 15C allows the user to control the camera operation with keyboard input, and in addition to the picked-up image 111 received from the lens-style camera 51, a key display 112 for keyboard input is shown on the display screen 68a. The key display 112 is configured to allow a plurality of kinds of characters to be specified with one key and enable a character string to be specified by the number of touching a key or what is called a flicker input in which the user slides the finger after touching the key.

The user can specify the control mode of the camera operation through keyboard input using the finger 107. The setting performed by the user is shown in a setting display section 114. The example shown in FIG. 15C shows that the user inputs "rotation" with the finger 107. The user inputs "rotation", to thereby cause the control section 65 to set a rotation mode to be described later. Note that the smartphone 61 includes a database, not shown, in which a plurality of character strings are described so as to correspond to one camera control mode, and the user can specify a desired control mode by inputting appropriate character strings related to the desired control mode. Note that a back button 113 for undoing processing is also displayed on the display screen 68a.

Such a keyboard input operation using a software keyboard is an input method suitable for a tablet PC or a smartphone. In addition, the user has only to perform operation on the smartphone 61 placed on the table 91, which allows the control mode to be specified relatively easy. In the method of selecting a control mode from a menu display constituted of a plurality of hierarchies to decide the control mode, if the mode to be selected is set in a deep hierarchy, for example, the mode specifying operation by the user is relatively cumbersome in some cases. Even in such a case, in the example shown in FIG. 15C, it is possible to easily specify the mode with keyboard input operation.

When the input mode is decided, the control section 65 shifts the processing to step S81 to detect presence or absence of button operation. When the user operates various buttons other than the key display 112 with the finger 107, the control section 65 shifts the processing to step S82 to perform control corresponding to the button operation. For example, when the user touches the position of the exposure button 37b in FIG. 3C, the control section 65 shifts the mode to an exposure setting mode.

On the other hand, when the user touches the key display 112, the control section 65 shifts the processing from step S83 to step S84, to determine the control mode according to the key input operation by the user (step S84). As shown in FIG. 16A, it is now supposed that the user performs an operation for touching the position of the setting display section 114 in the state where the characters "rotation" is displayed on the setting display section 114. Then, the control section 65 determines that the key operation by the user is for instructing the rotation mode in the step S4 to shift the mode to the rotation mode. Note that, when the instructed mode is not a rotation mode, the control section 65 executes another mode specified in the step S89. For example, as the other mode, various modes such as zoom mode, exposure mode, focus mode, and art filter mode can be considered.

In the photographing method shown in FIGS. 13A and 13B, the user holds the lens-style camera 51 with one hand and photographs the object from various angles. Therefore, the orientation of the image pickup device in the lens-style camera 51 is not necessarily in the horizontal or vertical direction. Specifically, when the lens-style camera 51 is configured by a cylindrical-shaped case, the user sometimes cannot recognize the orientation (rotation direction in the vertical plane) of the picked-up image unless the user sees the picked-up image on the display screen 68a. In this case, it is sometimes more preferable for the user to change the orientation of the picked-up image by performing image processing on the smartphone 61 side than to change the orientation of the lens-style camera 51 with the hand holding the lens-style camera 51. The rotation mode is for performing image processing for changing the rotation direction of the picked-up image.

FIGS. 16A to 16D are illustration drawings for describing the rotation mode.

When the rotation mode is set according to the button operation or the key input operation, the control section 65 shifts the processing from step S85 to step S86, to determine the initial position of the smartphone 61. Next, the control section 65 determines the rotation of the smartphone 61 to calculate the rotation angle.

Figure 16B:
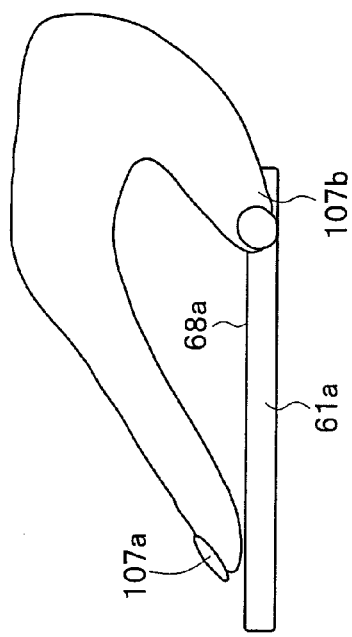
FIGS. 16A to 16D are illustrative diagrams for describing a rotation mode.
Figure 16D:
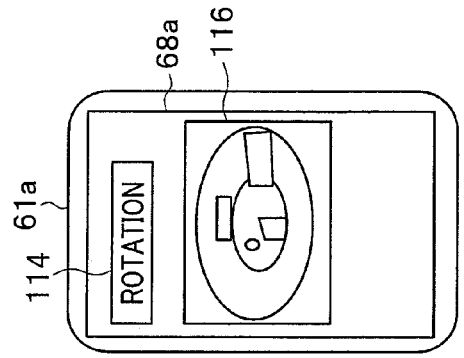
Figure 16A:
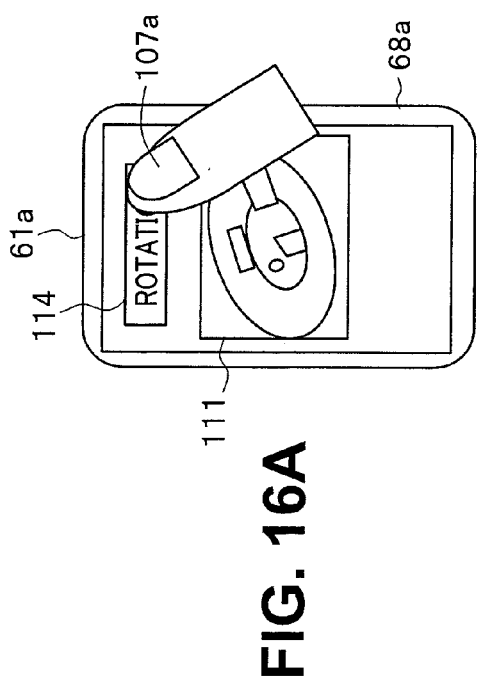

For example, in the state where the user touches the position of the setting display section 114 with the finger 107a as shown in FIG. 16A, the user holds the both side surfaces of the case 61a of the smartphone 61 between the finger 107b and another finger not shown, as shown in FIG. 16B and rotates the smartphone within the surface (within the horizontal surface) of the table 91 with the rear surface of the case 61a contacting the table 91. The initial position of the rotation is determined in the step S86, and the rotation amount is calculated in step S87. Note that the operation (rotation operation) method for specifying the rotation amount by the user can be appropriately set. For example, the control section 65 may determine that the rotation operation is finished when the user moves the finger 107a away from the position of the setting display section 114, and calculate the rotation angle at which the rotation operation is finished. Furthermore, the control section 65 determines the rotation amount by the number of repeat of the rotation operation in one direction and in the direction opposite to the one direction by the user or a speed of the rotation.

Figure 16C:
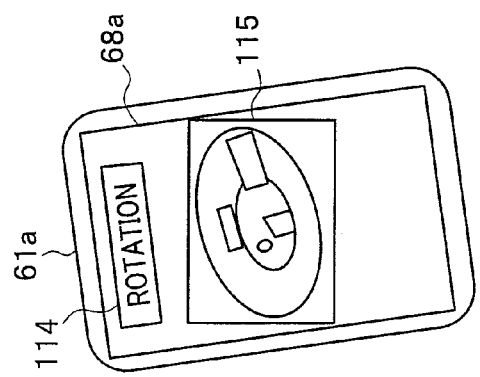

FIG. 16C shows an example of screen display when the user performs the rotation operation. In the example in FIG. 16C, the control section 65 allows an image obtained by rotating a display area 115 of the picked-up image 117 by the rotation amount corresponding to the rotation operation by the user to be displayed on the display screen 68a. If the rotation operation is finished in this state, the control section 65 generates a picked-up image 116 obtained by rotating the picked-up image 117 by the rotation amount corresponding to the rotation operation by the user (step S88), to cause the generated picked-up image 116 to be displayed on the display screen 68a.

When a predetermined period elapses from the state displaying the image as shown in FIG. 16C, or a predetermined operation is performed, the rotation mode is finished and the display returns to the one shown in FIG. 13A, for example. When the photographing button 102 is operated in this state, the picked-up image 116 shown in FIG. 16D is recorded in the recording section 64.

The present embodiment is thus capable of detecting the states of the lens-style camera and the smartphone, and providing the user interface suitable for at least one of the states. Such a configuration improves the operability, and the user can photograph an object in a desired composition with a simple operation. When the lens-style camera and the smartphone are used in the state separated from each other, in particular, the photographer does not have to move in accordance with the position of the lens-style camera. The photographer can capture the object in various compositions, and easily perform photographing operation by placing the smartphone on the table, and the like. Thus, if there are two devices to be operated with two hands of a human being, it is considered that there are various cases such as a case where the two devices are operated with both hands, respectively, a case where one of the devices is operated with both hands or with one hand, etc. However, there is not known a technique for controlling the devices by taking the states of the devices in the above-described cases into full consideration. According to the present invention, it is possible to surely achieve a simple operation using an optimal operation method under various situations. That is, according to the present invention, it is possible to detect the respective states such as holding state or placed-on-the-desk state of the two cooperative devices which are used by a user who operates the devices generally with two hands, by using the shaking determination function or the posture determination function provided to each of the devices, decide an operation optimal to the devices depending on the respective usage states of the devices, control the display, determine the operation, and perform control of simple and convenient cooperation of the devices. The present invention effectively uses the touch panel and display control of the devices.

Furthermore, in each of the embodiments of the present invention, description has been made by taking the digital camera as an example of the device for photographing. However, it is needless to say that the camera may be a lens-style camera, a digital single-lens reflex camera, a compact digital camera, a camera for moving picture such as a video camera and a movie camera, and also may be a camera built in a mobile information terminal (PDA: Personal Digital Assist) such as a mobile phone and a smartphone. Furthermore, the camera may be an industrial or medical optical device such as an endoscope and a microscope, or a monitoring camera, a car-mounted camera, or a stationary camera, for example, a camera attached to a television, a personal computer, or the like. It is needless to say that the present invention can be applied to an observation apparatus and an inspection apparatus which observe various objects from various angles. When inspection or observation is performed, it is more convenient if a plurality of devices can be mechanically connected or separated, or a way of holding the devices can be changed, depending on an object to be observed or inspected. Therefore, the present invention can be utilized in wide variety of fields.

The present invention is not limited to each of the embodiments as it is, but can be embodied by modifying constituent elements in the practical stage within a range without departing from the gist of the invention. Furthermore, various inventions can be formed by appropriately combining the plurality of constituent elements disclosed in each of the embodiments. For example, among all of the constituent elements shown in the embodiments, some constituent elements may be removed. Furthermore, the constituent elements from different embodiments may be appropriately combined.

Note that, in the claims, specification, and working flows in the drawings, even if description was made by using the expressions "first", "next" and the like, for convenience sake, it does not mean that processing steps have to be executed in this order. In addition, needless to say, each of the steps constituting the working flow may be appropriately omitted regarding the part which does not affect the essential part of the invention.

In addition, among the techniques described above, many of the controls and functions described mainly in the flowcharts can be set by a program, and the above-described controls and functions can be executed by reading and executing the program by a computer. The entirety or a part of such a program can be recorded or stored as a computer program product in a portable medium such as a flexible disk, CD-ROM and a nonvolatile memory, or a storage medium such as a hard disk and a volatile memory, and can be distributed or provided at the time of product shipment or through a portable medium or telecommunications line. A user can easily use the image pickup display apparatus and display method according to the embodiments by downloading the program through a communication network to install the program into a computer, or by installing the program from a recording medium into a computer.

What is claimed is:

1. An image pickup display apparatus comprising:
   a communication section that is capable of receiving a picked-up image from an image pickup unit;
   a display section that displays the picked-up image received by the communication section;
   an operation section for controlling image pickup by the image pickup unit;
   a posture determination section that determines a posture of a case housing the communication section, the display section, and the operation section of the image pickup display apparatus; and
   a control section that changes a user interface provided by the display section and the operation section based on a result of the determination, performed by the posture determination section, of the posture of the case,
   wherein the image pickup unit and the case housing the communication section, the display section, and the operation section, are capable of being separated from each other,
   wherein the posture determination section determines whether the case is placed or hand held, and wherein the control section provides a first user interface via the display section and the operation section responsive to a determination by the posture determination section that the case is placed, but provides a second user interface via the display section and the operation section responsive to a determination by the posture determination section that the case is hand held, and
   wherein the posture determination section determines that the case is placed responsive to a determination that both (1) the operation section has a touch surface facing upward with respect to gravity, and (2) a vibration amount in a vertical direction normal to the touch surface of the operation section is less than a predetermined amount, and otherwise determines that the case is hand held.

2. The image pickup display apparatus according to claim 1, wherein
   the posture determination section further determines the state of the image pickup unit, and
   the control section receives the result of determination performed by the posture determination section, and changes the user interface provided by the display section and the operation section based on whether or not the case is arranged on another object and whether or not the image pickup unit is arranged in a stationary state.

3. The image pickup display apparatus according to claim 1, further comprising:
   a state determination section that determines whether or not the case and the image pickup unit are separated from each other, and
   the control section changes the user interface provided by the display section and the operation section based whether or not the case and the image pickup unit are separated from each other.

4. The image pickup display apparatus according to claim 1, wherein the posture determination section further determines that the case is arranged on another object when an operation surface of the operation section is fixed so as to face upward, and wherein the control section changes the user interface provided by the display section and the operation section based on the determination that the case is arranged on another object.

5. The image pickup display apparatus according to claim 2, wherein the posture determination section further determines that the case is arranged on another object when an operation surface of the operation section is fixed so as to face upward, and wherein the control section changes the user interface provided by the display section and the operation section based on the determination that the case is arranged on another object.

6. The image pickup display apparatus according to claim 3, wherein the posture determination section further determines that the case is arranged on another object when an operation surface of the operation section is fixed so as to face upward, and wherein the control section changes the user interface provided by the display section and the operation section based on the determination that the case is arranged on another object.

7. The image pickup display apparatus according to claim 4, wherein the posture determination section further determines that the case is arranged on another object when a vibration of the operation surface of the operation section in a vertical direction is smaller than a predetermined threshold, and wherein the control section changes the user interface provided by the display section and the operation section based on the determination that the case is arranged on another object.

8. The image pickup display apparatus according to claim 5, wherein the posture determination section further determines that the case is arranged on another object when a vibration of the operation surface of the operation section in a vertical direction is smaller than a predetermined threshold, and wherein the control section changes the user interface provided by the display section and the operation section based on the determination that the case is arranged on another object.

9. The image pickup display apparatus according to claim 6, wherein the posture determination section further determines that the case is arranged on another object when a vibration of the operation surface of the operation section in a vertical direction is smaller than a predetermined threshold, and wherein the control section changes the user interface provided by the display section and the operation section based on the determination that the case is arranged on another object.

10. The image pickup display apparatus according to claim 1, wherein
the operation section is constituted of a touch panel disposed on the display section, and
the control section changes a number of operation icons to be displayed on the display section based on whether or not the case is arranged on the other object.

11. The image pickup display apparatus according to claim 1, wherein
the operation section is constituted of a touch panel disposed on the display section, and
the control section changes an arranging area of operation icons to be displayed on the display section based on a result of the determination, performed by the posture determination section, of the posture of the case.

12. The image pickup display apparatus according to claim 1, wherein the operation section is constituted of a touch panel disposed on the display section and a software keyboard displayed on the display section.

13. The image pickup display apparatus according to claim 1, wherein the control section rotates the picked-up image from the image pickup unit in accordance with rotation of the case, when the case is arranged on another object.

14. An image pickup display method comprising:
receiving, by a communication section, a picked-up image from an image pickup unit;
displaying, by a display section, the picked-up image received by the communication section;
determining, by a posture determination section, a posture of a case housing the communication section, the display section, and an operation section; and
changing a user interface provided by the display section and the operation section, by a control section, based on a result of the determination, by the posture determination section, of the posture of the case,
wherein the image pickup unit and the case housing the communication section, the display section, and the operation section, are capable of being separated from each other,
wherein the act of determining, by the posture determination section, a state of a case housing the communication section, the display section, and an operation section, includes determining whether the case is placed or hand held,
wherein the act of changing a user interface provided by the display section and the operation section, by a control section, based on a result of the determination, by the posture determination section, of the state of the case, includes providing a first user interface via the display section and the operation section responsive to a determination by the posture determination section that the case is placed, but providing a second user interface via the display section and the operation section responsive to a determination by the posture determination section that the case is hand held, and
wherein the posture determination section wherein the posture determination section determines that the case is placed responsive to a determination that both (1) the operation section has a touch surface facing upward with respect to gravity, and (2) a vibration amount in a vertical direction normal to the touch surface of the operation section is less than a predetermined amount, and otherwise determines that the case is hand held.

15. A non-transitory computer readable recording medium which stores a program for causing a computer to execute procedures of:
receiving, by a communication section, a picked-up image from an image pickup unit;
displaying, by a display section, the picked-up image received by the communication section;
determining whether a case housing the communication section, the display section, and an operation section, is placed or hand held; and
providing a first user interface via the display section and the operation section responsive to a determination that the case is placed, and otherwise providing a second user interface via the display section and the operation section responsive to a determination that the case is hand held,
wherein the image pickup unit and the case housing the communication section, the display section, and the operation section, are capable of being separated from each other, and
wherein the posture determination section wherein the posture determination section determines that the case is placed responsive to a determination that both (1) the operation section has a touch surface facing upward with respect to gravity, and (2) a vibration amount in a vertical direction normal to the touch surface of the operation section is less than a predetermined amount, and otherwise determines that the case is hand held.

16. The image pickup display apparatus according to claim 1, wherein the posture determination section further determines, independently, both of (A) a state of the image pickup unit and (B) the state of the case housing the communication section, the display section, and the operation section of the image pickup display apparatus, and wherein the control section changes the user interface provided by the display section and the operation section based on both (A) the state of the image pickup unit and (B) the state of the case.

17. The image pickup display method of claim 14 wherein the act of determining, by a posture determination section, further determines, independently, both of (A) a state of the image pickup unit and (B) the state of a case housing the communication section, the display section, and the operation section, and wherein the act of changing a user interface provided by the display section and the operation section is done based on both (A) the state of the image pickup unit and (B) the state of the case.

18. The non-transitory computer readable recording medium of claim 15 wherein the act of determining further determines, independently, both of (A) a state of the image pickup unit and (B) the state of the case housing the communication section, the display section, and the operation section, and wherein the act of changing a user interface provided by the display section and the operation section is done based on both (A) the state of the image pickup unit and (B) the state of the case.

* * * * *